(12) United States Patent
Zuili

(10) Patent No.: US 8,886,566 B2
(45) Date of Patent: *Nov. 11, 2014

(54) METHOD AND SYSTEM TO DETECT INVALID AND FRAUDULENT IMPRESSIONS AND CLICKS IN WEB-BASED ADVERTISEMENT SYSTEMS

(71) Applicant: Patrick Zuili, Boca Raton, FL (US)

(72) Inventor: Patrick Zuili, Boca Raton, FL (US)

(73) Assignee: Brite Smart Corp., Tyler, TX (US)

( * ) Notice: Subject to any disclaimer, the term of this patent is extended or adjusted under 35 U.S.C. 154(b) by 226 days.

This patent is subject to a terminal disclaimer.

(21) Appl. No.: 13/691,892

(22) Filed: Dec. 3, 2012

(65) Prior Publication Data

US 2013/0117104 A1    May 9, 2013

Related U.S. Application Data

(63) Continuation of application No. 13/117,929, filed on May 27, 2011, now Pat. No. 8,326,763, which is a continuation of application No. 11/781,716, filed on Jul. 23, 2007, now Pat. No. 7,953,667, which is a continuation-in-part of application No. 10/360,688, filed on Feb. 7, 2003, now Pat. No. 7,249,104.

(51) Int. Cl.
*G06F 21/00* (2013.01)
*G06Q 30/02* (2012.01)

(52) U.S. Cl.
CPC ............ *G06Q 30/0248* (2013.01); *G06Q 30/02* (2013.01)
USPC .......................................................... 705/52

(58) Field of Classification Search
USPC ................. 705/26, 27, 52–54, 64–67, 75–78; 713/168, 169; 707/705–788; 726/1–5, 726/26–30
See application file for complete search history.

(56) References Cited

U.S. PATENT DOCUMENTS

| | | | | |
|---|---|---|---|---|
| 5,848,396 A * | 12/1998 | Gerace | ........................ | 705/7.33 |
| 5,991,740 A * | 11/1999 | Messer | ...................... | 705/14.29 |
| 6,125,352 A * | 9/2000 | Franklin et al. | ............... | 705/26.8 |
| 6,285,987 B1 * | 9/2001 | Roth et al. | .................. | 705/14.71 |
| 6,775,831 B1 * | 8/2004 | Carrasco et al. | ............... | 718/100 |
| 7,020,622 B1 * | 3/2006 | Messer | ...................... | 705/26.44 |
| 7,043,471 B2 * | 5/2006 | Cheung et al. | ......................... | 1/1 |
| 7,136,860 B2 * | 11/2006 | Doliov | ................................. | 1/1 |
| 2001/0007097 A1 * | 7/2001 | Kim | ................................. | 705/14 |
| 2001/0037314 A1 * | 11/2001 | Ishikawa | .......................... | 705/67 |
| 2003/0216930 A1 * | 11/2003 | Dunham et al. | .................... | 705/1 |
| 2006/0041505 A1 * | 2/2006 | Enyart | ............................ | 705/40 |

OTHER PUBLICATIONS

Mulhall, "How Real a Threat Does Computer Crime Represent?", Aug. 1, 1996, Computer Fraud & Security Bulletin.*

* cited by examiner

*Primary Examiner* — Mary Cheung
(74) *Attorney, Agent, or Firm* — John R. Kasha; Kasha Law LLC

(57) ABSTRACT

This invention improves upon existing pay-per-click arrangements by periodically generating a code associated end users. This code, preferably in the form of a serial number, is compared to the end user of the website, such that by observing a metric like the number of clicks for a given period of time, be it a short time or a longer period, such as a day or a week, the system can automatically determine if certain clicks are illegitimate. This allows the pay-per-click company to more fairly invoice the merchants, thereby preventing fraudulent over use.

20 Claims, 1 Drawing Sheet

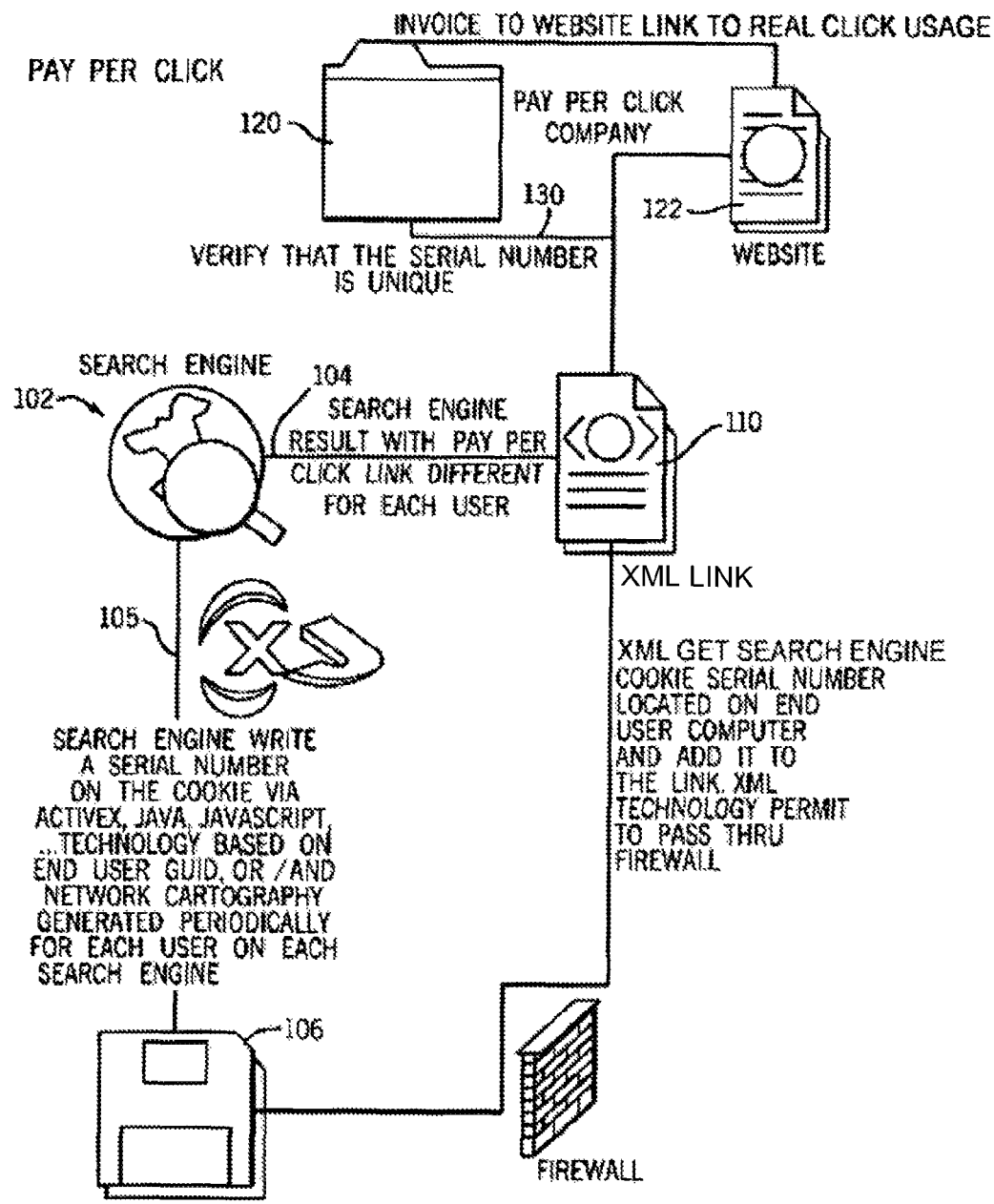

METHOD AND SYSTEM TO DETECT INVALID AND FRAUDULENT IMPRESSIONS AND CLICKS IN WEB-BASED ADVERTISEMENT SYSTEMS

CROSS REFERENCE TO RELATED APPLICATION

This application is a continuation application of U.S. patent application Ser. No. 13/117,929, filed May 27, 2011, now U.S. Pat. No. 8,326,763, which is a continuation application of U.S. patent application Ser. No. 11/781,716, filed Jul. 23, 2007, which is a continuation-in-part application of U.S. patent application Ser. No. 10/360,688, filed Feb. 7, 2003, now U.S. Pat. No. 7,249,104. All of the above mentioned applications are incorporated by reference herein in their entireties.

FIELD OF THE INVENTION

This invention relates generally to network computing of the type which occurs over the Internet, for example, and, more particularly, to a method of protecting the providers of pay-per click services from multiple illegitimate usages.

BACKGROUND OF THE INVENTION

Over the last few years in particular, the capabilities of the Internet have grown dramatically, with the introduction of new protocols (i.e., XML), advanced browsers, electronic commerce capabilities, and other features.

Numerous commercial enterprises are now attempting to somehow profit through this new infrastructure, in many cases by providing services that attach a smaller incremental monetary value to a particular transaction.

One such type of capability is the pay-per-click search engine popularized by Google and other companies. In accordance with such a capability, a user goes to a website, and inputs the name of goods or services that they would like the pay-per-click company to find. Various providers of goods and services register their websites with the company, and these are provided to the user in a list which is prioritized by the level of compensation which the merchant will give the pay-per-click company if the user is routed to their site. For example, using such a system, if a user types in "binoculars," the pay-per-click system might return five potential links, with the most prominent one being associated with that supplier of binoculars which will compensate for a penny or a few cents more than the links presented below.

One problem with existing systems is that a user may cause an undesirable level of expenditure on the part of the merchant by overclicking on a particular link. In some cases, it has been known that some users have done this simply for the purpose of undermining a particular provider or competitor. Since the existing systems have no way of knowing whether a link through is legitimate or bogus, the provider of the goods/services winds up having to pay the pay-per-click provider excess sums, with the fraudulent perpetrator remaining unreprimanded.

SUMMARY OF THE INVENTION

This invention improves upon existing pay-per-click arrangements by periodically generating a code associated with the search-engine users. This code, preferably in the form of a serial number, is compared to the user of the website, such that by observing a metric like the number of clicks for a given period of time, be it a short time or a longer period, such as a day or a week, the system can automatically determine if certain clicks are illegitimate. This allows the pay-per-click company to more fairly invoice the merchants, thereby preventing fraudulent over use.

BRIEF DESCRIPTION OF THE DRAWINGS

FIG. 1 is a diagram which illustrates a per-per-click system incorporating a preferred embodiment of the present invention.

DETAILED DESCRIPTION OF THE INVENTION

Reference is made to FIG. 1 which illustrates a typical configuration associated with a pay-per-click implementation. It is noted that although the diagram includes certain interconnected graphical blocks, these are not taken to mean "hardware" or "software," but may include any combination of hardware/software necessary to implement a particular function. In addition, although lines are drawn between the various components, this is not meant to imply that they are necessarily implemented in close proximity to one another, since in many cases these capabilities will be remote.

The search engine 102 provides a result along path 104 which is indicative of a link associated with different users. Engine 102 may be any existing or yet-to-be-developed system, including findwhat.com, Google Adwords, overture, looksmart.com, kanoodle.com, and so forth.

In addition to the result generated along path 104, according to this invention, the search engine generates a code, preferably in the form of a serial number utilizing a cookie via ActiveX, Java, Javascript, or any other type of technology based upon the end-user's Global Unique Identifier (GUID). In addition, or as an alternative, network cartography may be generated periodically for each user based upon their use of the search engine 102.

Although the encoded serial number is shown being written to a floppy disk 106, again, it will be appreciated by those of skill in the art that any type of storage capability, such as a flash memory, and so forth may alternatively be utilized. The code (e.g., a serial number) generated by the search engine along path 105 is concatenated with the result along path 104 through XML link 110. Given the serial number provided through the cookie, this allows the concatenation to occur through firewalls and other devices which may otherwise block the transmission as unauthorized.

As the pay-per-click company 120, information is received regarding a click to website 122, but at the same time, the serial number is transmitted to the company 120 along path 130. This allows the pay-per-click company 120 to invoice the website 122 only when the serial numbers received. According to the invention, a legitimate serial number may be generated in different ways, including the first use of a different user having a unique IP address, or, if multiple requests are made by the same user, they may be considered legitimate if they are sufficiently spaced apart in time to be indicative of a legitimate as opposed to fraudulent access to the website 122.

What is claimed is:

1. A method for detecting fraudulent activity in a pay-per-click system, comprising:
   a) generating a unique code for identifying an end user's computer;
   b) transmitting said code to said end user's computer;

c) transmitting to said end user's computer one or more links associated with one or more websites associated with one or more merchants;

d) generating website information regarding a website selected by the end user when said end user clicks one of said links;

e) receiving said code and said website information from said end user's computer; and f) detecting fraudulent activity by measuring the duration between clicks by said end user to said selected website by examining said code and website information.

2. A method for detecting fraudulent activity in a pay-per-click system as in claim 1 further comprising the step of: storing said code.

3. A method for detecting fraudulent activity in a pay-per-click system as in claim 1 further comprising the step of: storing said code in a cookie.

4. A method for detecting fraudulent activity in a pay-per-click system as in claim 3 wherein said storing step is performed using at least one of the following: ActiveX, Java, and Javascript.

5. A method for detecting fraudulent activity in a pay-per-click system as in claim 1 further comprising the step of: concatenating said code with at least one of said links to said websites.

6. A method for detecting fraudulent activity in a pay-per-click system as in claim 1 wherein said code is based on a global unique identifier of said end user's computer.

7. A method for detecting fraudulent activity in a pay-per-click system as in claim 1 wherein said code is based on a network cartography of said end user's computer.

8. A method for detecting fraudulent activity in a pay-per-click system as in claim 1 wherein said code is encoded.

9. A method for detecting fraudulent activity in a pay-per-click system as in claim 1 further comprising the step of: preventing a click-through to at least one of said websites associated with said merchants if fraudulent activity is detected.

10. A method for identifying click fraud, the method comprising the steps of:

generating a code, the code identifying said end user's computer;

sending said code to said end user's computer;

transmitting one or more links associated with one or more web pages to an end user at the end user's computer;

receiving data from said end user's computer, said data including said code and information about one or more selections by the end user of at least one of said one or more web pages;

determining from said data whether said at least one of said selections of said at least one web page is fraudulent; and examining a duration between a time of one of said selections of said at least one web site and a time of another of said selections of said at least one web site.

11. A method as in claim 10 wherein said code is based on a global unique identifier of said end user's computer.

12. A method as in claim 10 wherein said code is based on a network cartography of said end user's computer.

13. A method as in claim 10 wherein said code is encoded.

14. A method for detecting fraudulent activity in a pay-per-click system, comprising:

a) generating a unique code for identifying an end user's computer;

b) transmitting said code to said end user's computer;

c) transmitting to said end user's computer one or more links associated with one or more websites associated with one or more merchants;

d) receiving website information regarding a website selected by the end user together with said code, when said end user clicks one of said links; and e) detecting fraudulent activity by measuring the duration between clicks by said end user's computer to said selected website by examining said code and website information.

15. A method for detecting fraudulent activity in a pay-per-click system as in claim 14 further comprising the step of: storing said code at said end user's computer.

16. A method for detecting fraudulent activity in a pay-per-click system as in claim 15 wherein said storing step is performed using at least one of the following: ActiveX, Java, and Javascript.

17. A method for detecting fraudulent activity in a pay-per-click system as in claim 14 further comprising the step of: storing said code in a cookie.

18. A method for detecting fraudulent activity in a pay-per-click system as in claim 14 further comprising the step of: concatenating said code with at least one of said links to said websites.

19. A method for detecting fraudulent activity in a pay-per-click system as in claim 14 wherein said code is based on a global unique identifier of said end user's computer.

20. A method for detecting fraudulent activity in a pay-per-click system as in claim 14 wherein said code is encoded.

* * * * *